United States Patent [19]

Casey et al.

[11] Patent Number: 5,038,367
[45] Date of Patent: Aug. 6, 1991

[54] OPINION SAMPLING DEVICE

[76] Inventors: William Casey, 201 E. 87th St., New York, N.Y. 10128; Darwin Eakins, 835 Louisiana St., Lawrence, Kans. 66044

[21] Appl. No.: 459,063

[22] Filed: Dec. 29, 1989

[51] Int. Cl.$^5$ .......................... G09B 7/00; G06M 3/06; H03K 17/28
[52] U.S. Cl. ........................................ 377/13; 377/15; 377/30; 377/112; 434/362; 235/91 G; 235/100; 307/603
[58] Field of Search ................ 377/13, 15, 30, 6, 112, 377/2; 434/327, 362; 235/50 A, 50 B, 50 R, 51, 91 D, 91 G, 91 J, 100; 307/603

[56] References Cited

U.S. PATENT DOCUMENTS

| | | | |
|---|---|---|---|
| 3,689,930 | 9/1972 | Strickland | 346/1.1 |
| 3,747,228 | 7/1973 | Yamamoto | 434/320 |
| 4,234,933 | 11/1979 | Adelson et al. | 364/900 |
| 4,320,256 | 3/1982 | Freeman | 379/73 |
| 4,345,315 | 8/1982 | Cadotte et al. | 364/900 |
| 4,628,521 | 12/1986 | Nishimura et al. | 377/30 |
| 4,667,336 | 5/1987 | Best | 377/15 |
| 4,730,253 | 3/1988 | Gordon | 434/362 |

Primary Examiner—John S. Heyman
Attorney, Agent, or Firm—Schechter, Brucker & Pavane

[57] ABSTRACT

A polling device (10) includes a housing (12), pushbuttons (14, 16) mounted on the housing for receiving customer responses to an inquiry, circuitry for counting and storing the number of times each pushbutton (14, 16) is depressed, and a time delay circuit for disabling the counting circuitry for a predetermined period of time after one of the pushbuttons has been depressed for discouraging repetitive voting. A display unit (46) for reading and displaying the number of times each pushbutton (14, 16) has been depressed is also provided.

26 Claims, 5 Drawing Sheets

OPINION SAMPLING DEVICE

BACKGROUND OF THE INVENTION

1. Field of the Invention

This invention pertains to a device for recording customer opinions, and more particularly to an opinion sampler which avoids inappropriate, repetitive voting.

2. Description of the Prior Art

A number of opinion sampling devices exist in the prior art. Such devices typically include an interactive terminal for recording customer responses to multiple inquiries. While such devices serve their intended function, responding to multiple inquiries is a time-consuming process and, therefore, busy customers may be discouraged from using such opinion sampling devices. While customer usage may be increased by reducing the number of inquiries, such devices are subject to the abuse of repetitive voting.

It is, therefore, a primary object of the present invention to provide a customer-polling device which encourages participation and discourages improper use.

It is a further object of the invention to provide a simple, inexpensive, battery-operated market research device which facilitates good customer service by providing daily customer feedback.

It is a still further object of the invention to provide a fast and simple polling system for encouraging customer participation, and more particularly a system requiring only a "yes" or "no" answer to a single inquiry, thereby requiring only a moment of a customer's time.

It is yet another object of the invention to provide a polling device wherein the device includes a memory means for storing the customer responses.

It is yet a further object of the present invention to prevent the abuse of repetitive voting by providing a time-delay feature which disables any attempt to enter an additional response for a predetermined, adjustable time period.

It is also an object of the invention to provide a display unit adapted for "reading" the total number of each type of response recorded by the polling device.

SUMMARY OF THE INVENTION

Broadly speaking, the invention is an electronic apparatus comprising a polling device including a first housing; a plurality of switch means mounted on the housing for manipulation by a user for entering a response to an inquiry, each switch means representing a specific response to the inquiry; circuit means in the housing, the circuit means comprising counting means in electrical communication with the switch means for separately counting and storing the number of times each switch means is manipulated; and time delay means in the housing in electrical communication with the counting means for disabling the counting means for a predetermined time period after one of the switch means has been manipulated, thereby discouraging repetitive responses by a single user. The preferred apparatus includes a display unit comprising a second housing, a numeric display mounted on the second housing, and means for connecting the numeric display in electrical communication with the counting means in the polling device for displaying the numbers stored thereby.

Polling devices in accordance with the present invention have a variety of applications. For example, the polling devices may be used in banks, with one polling device being placed near each teller, each polling device bearing a single inquiry, such as "WERE YOU SATISFIED WITH THE SERVICE PROVIDED BY YOUR TELLER?" The customer would then enter his/her response by manipulating the appropriate switch means. In a preferred embodiment, the switch means comprises two pushbuttons, one for entering a "YES" response and one for a "NO" response. At regular intervals, perhaps once each day, the total number of YES and NO responses recorded by each polling device could be read by the display unit thereby providing the bank with important information concerning customer satisfaction with teller services. Thereafter, the counting circuit in the polling device is reset to zero. In the preferred embodiment, the display unit is releasably connected to the polling device by a cable having a connector at one end which mates with a complementary connector in the polling device. In this way, a single display unit can be used to successively read the output from several polling devices.

The present invention also comprises a method for polling responses to an inquiry which, broadly speaking, comprises the steps of providing a device having a plurality of switch means mounted thereon for manipulation by a user for entering a response to an inquiry, each switch means representing a specific response to the inquiry; separately counting and storing the number of times each specific response to the inquiry is entered to the device; and discontinuing storage of the response for a predetermined time period after a response is entered to the device, thereby discouraging repetitive responses by a single user.

Further features and advantages of the apparatus in accordance with the present invention will be more fully apparent from the following detailed description and annexed drawings of the presently preferred embodiments thereof.

DETAILED DESCRIPTION OF THE PREFERRED EMBODIMENTS

Figure 1:
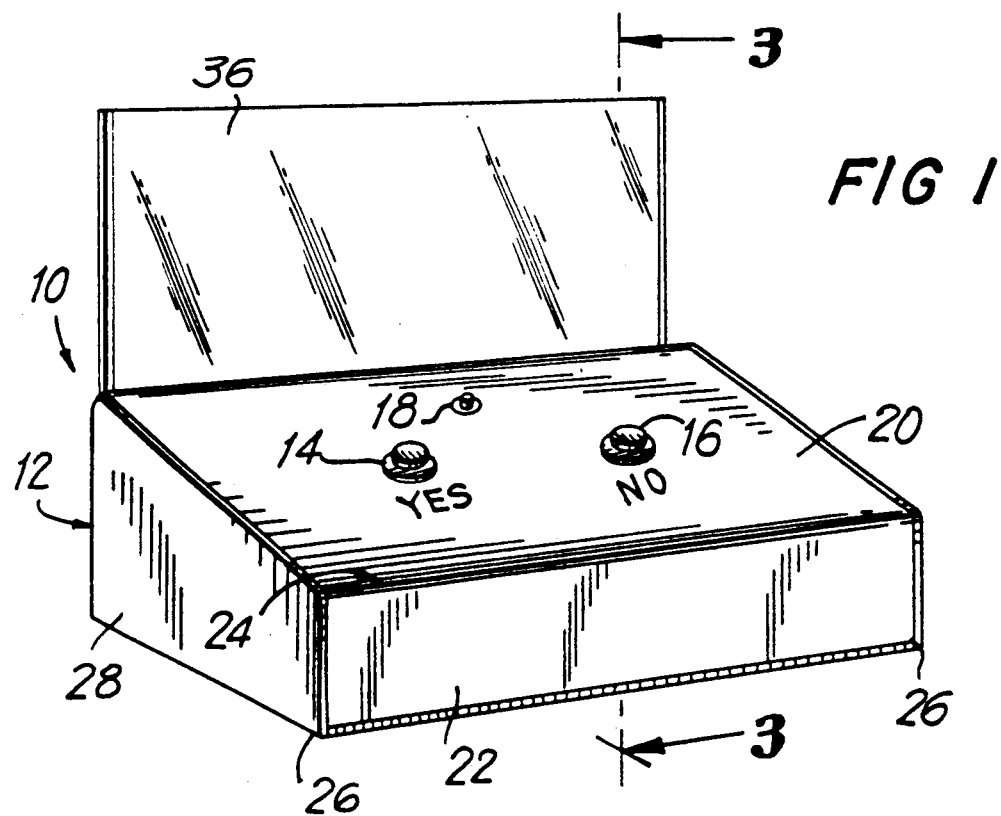
FIG. 1 is a perspective view of an opinion sampling device in accordance with the present invention.

Referring now to the drawings, FIG. 1 is a perspective view of an opinion sampling device 10 in accordance with the present invention. As shown, the device 10 comprises a case or housing 12 suitable for placement on a counter, pedestal, stand, etc. Protruding through the top panel 20 of the housing 12 are push-buttons 14, 16 and an indicator light 18. As shown, the words YES and NO are written below the pushbuttons 14, 16, respectively.

Preferably, top panel 20 is integrally formed with front and back panels 22 and 23, respectively, for defining a cover 24. As shown, cover 24 is hinged at 26 to the sidewalls 28 of housing 12 such that the cover 24 may be pivoted to an open position in which the contents of the housing 12 are exposed. Of course, the device 10 may be provided with an appropriate locking mechanism to prevent unauthorized opening of cover 24.

Figure 3:
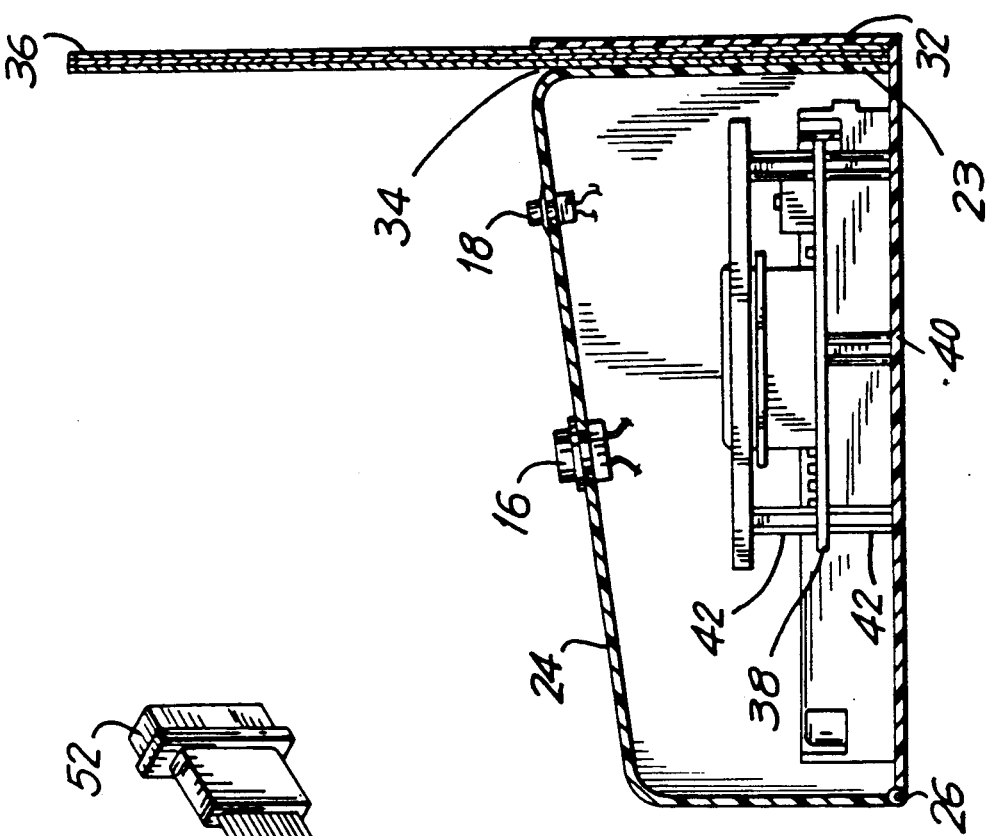
FIG. 3 is a sectional view taken substantially along lines 3—3 of FIG. 1.

As best seen in FIGS. 1 and 3, the rear wall 32 of the housing 12 is in spaced relation from the back wall 23 of the cover 24 for defining a space 34. This space accommodates a placard 36 having a customer inquiry thereon. For example, in the case of a bank, the question might read: "WERE YOU SATISFIED WITH THE SERVICE PROVIDED BY THIS TELLER?", in response to which the customer would press either pushbutton 14 (YES) or pushbutton 16 (NO). Each time one of the pushbuttons 14, 16 is depressed, the response is stored by circuitry in the housing 12, the operation of which is more fully described below. In accordance with the present invention, after one of the pushbuttons 14, 16 is depressed, the circuitry in the housing 12 for counting responses is temporarily disabled, such that any additional response entered by the same customer will not be recorded. Based on experience, this time delay is preferably set at 6-19 seconds though, of course, any suitable time delay may be used. Preferably, any attempt to enter an additional response during the time delay resets the time delay to run anew, thereby making it even more difficult for a customer to enter multiple responses.

Each time a customer enters a response by pushing one of the pushbuttons 14, 16, the indicator light 18 lights, thereby advising the customer that his response has been entered. As will be more fully described below, the indicator light 18 may be set to light momentarily, i.e. only so long as one of the pushbuttons 14, 16 is depressed, or, alternatively, as long as the predetermined time delay is in effect. The latter arrangement is advantageous insofar as the customer may be instructed (as on placard 36) to enter a response only when the light 18 is not lit, though to some extent it facilitates entry of multiple responses, as a customer wishing to enter multiple responses could simply wait until the light 18 is out. However, considering that the device 10 will typically be in a highly visible location, such as at a bank teller's window, it is anticipated that any customer lingering at one of the devices 10 will be noticed, thereby minimizing any disadvantage resulting from keeping the light 18 lit as long as the time delay is in effect.

Figure 2:
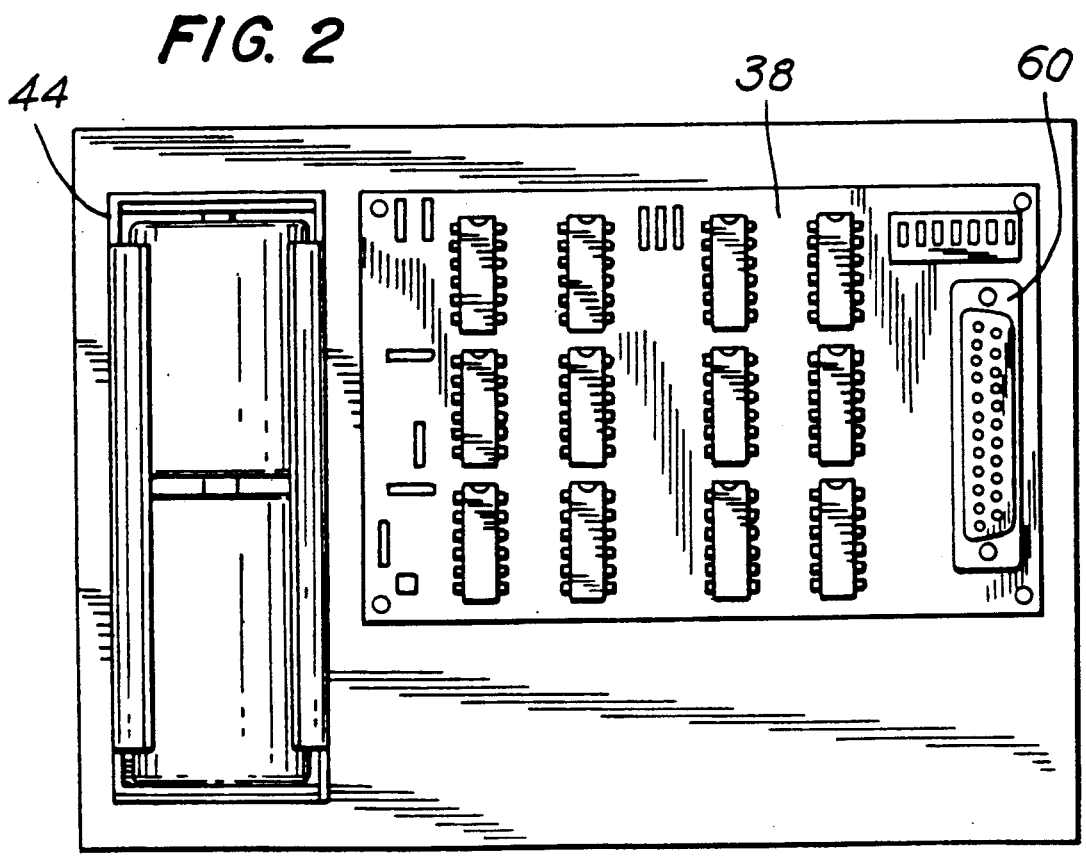
FIG. 2 is a top-plan view of the opinion sampling device of FIG. 1, shown with the cover removed.

As best seen in FIGS. 2 and 3, the circuitry inside the housing 12 is mounted on a circuit board 38 secured to the bottom wall 40 of the housing 12 as by spacers 42. Also shown in FIGS. 2 and 3 is battery pack 44 for powering the circuit board 38 and light 18. An indication that the batteries from battery pack 44 must be replaced is given when light 18 does not light at the appropriate time.

Figure 6:
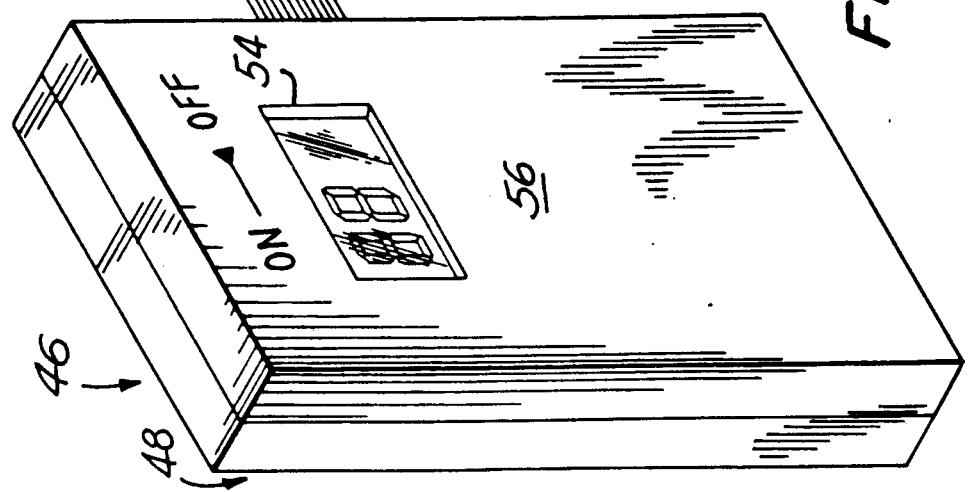
FIG. 6 is a perspective view of the display unit.
Figure 5:
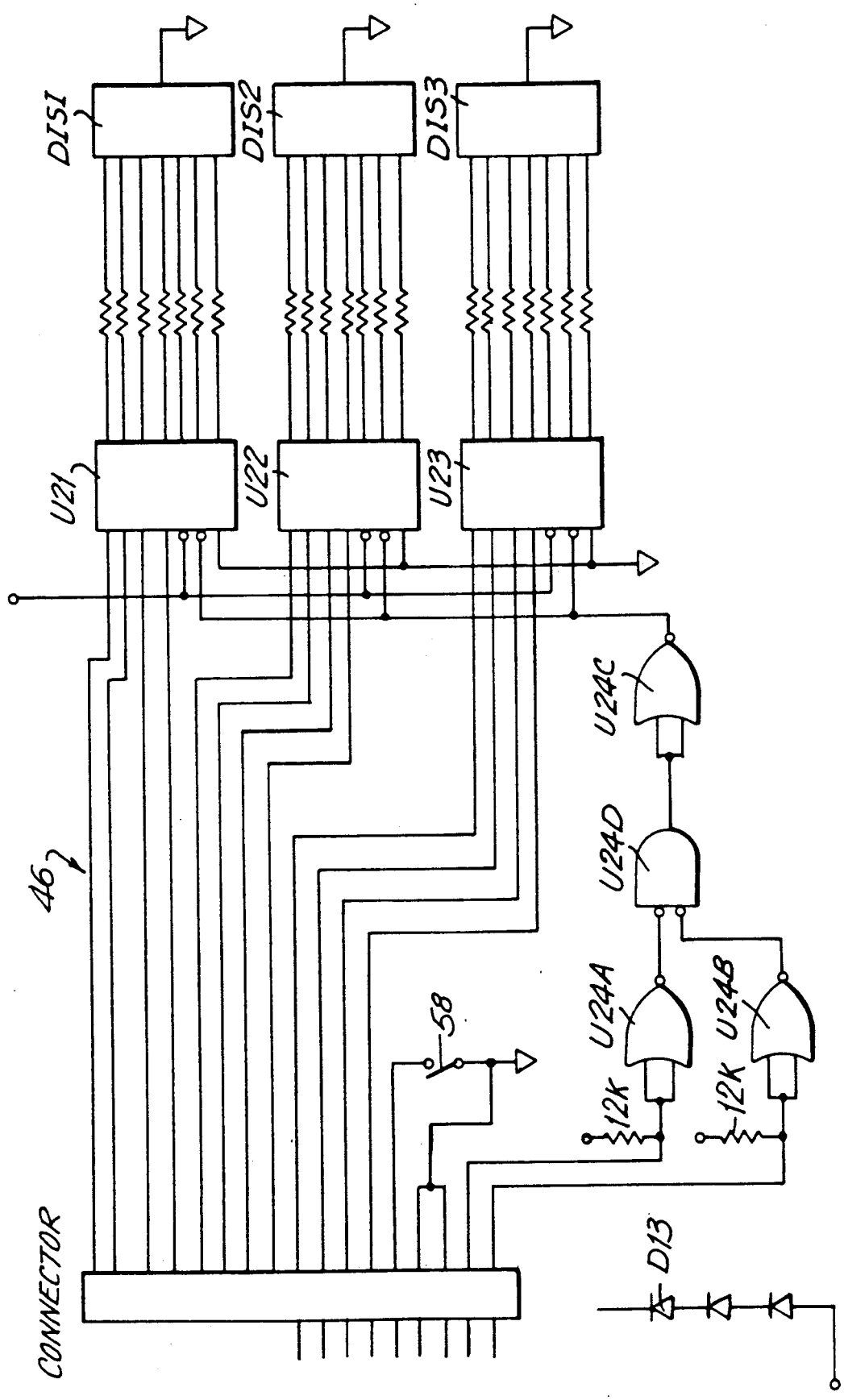
FIG. 5 is a schematic view of the circuitry for the display unit.

Referring now to FIG. 6, the invention further comprises a display unit 46 for "reading" the output from the device 10. As shown, display unit 46 comprises a housing 48, a ribbon connector 50 having a multi-pin connector 52 at its free end, an LED display 54 in the top wall 56 of the housing 48, and a 2-position toggle switch 58 also disposed in the wall 56. The circuit inside the display unit 46 is shown in FIG. 5 and will be more fully described below. Like the circuit in the opinion sampling device 10, the circuit in the display unit 46 preferably comprises a circuit board secured, as by spacers, to the bottom wall of the housing 48, the circuit being powered by a single 9-volt battery mounted in the housing. Dimming of display 54 is an indication that the battery of display unit 46 must be replaced. A door (not shown) is provided in housing 48 to replace the battery.

To read the output from the device 10, the cover 24 is opened thereby exposing the circuit board 38. Mounted on the circuit board 38 is a connector 60 for mating with the connector 52 of the display unit 46. With the display unit 46 thus connected to the device 10, and the switch 58 in the "ON" position, the "YES" and "NO" counts stored by the device 10 may be displayed on the LED display 54 of display unit 46. As will be more fully described below, the "YES" counts are read by the simple expedient of depressing pushbutton 14, and the "NO" counts are read by depressing pushbutton 16. Once both counts are read and recorded by the operator of display unit 46, both pushbuttons 14, 16 are depressed simultaneously thereby resetting the counters on the circuit board 38 to zero. At that point, the connector 52 is disengaged from the connector 60, the cover 24 is closed, and the opinion sampling device 10 is again ready for use. The display unit 46 may then be used to read the "YES" and "NO" counts stored in another opinion sampling device, and so on.

Having described the general mode of operation of opinion sampling device 10 and display unit 46, the operation of the circuits in the device 10 and display unit 46 will now be explained.

OPERATION OF CIRCUIT FOR OPINION SAMPLING DEVICE 10

The circuit for opinion sampling device 10 comprises a double counter that advances one of two digital counters each time one of the pushbuttons 14, !6 is depressed. Simultaneously, a variable time delay between six and nineteen seconds is activated. During this time delay, the counters responsive to pushbuttons 14, 16 are disabled, thereby preventing a user from "stuffing" the polling device 10, i.e., entering multiple responses. In fact, if either pushbutton 14, 16 is depressed during the time delay, the time delay is reset.

Figure 4A:
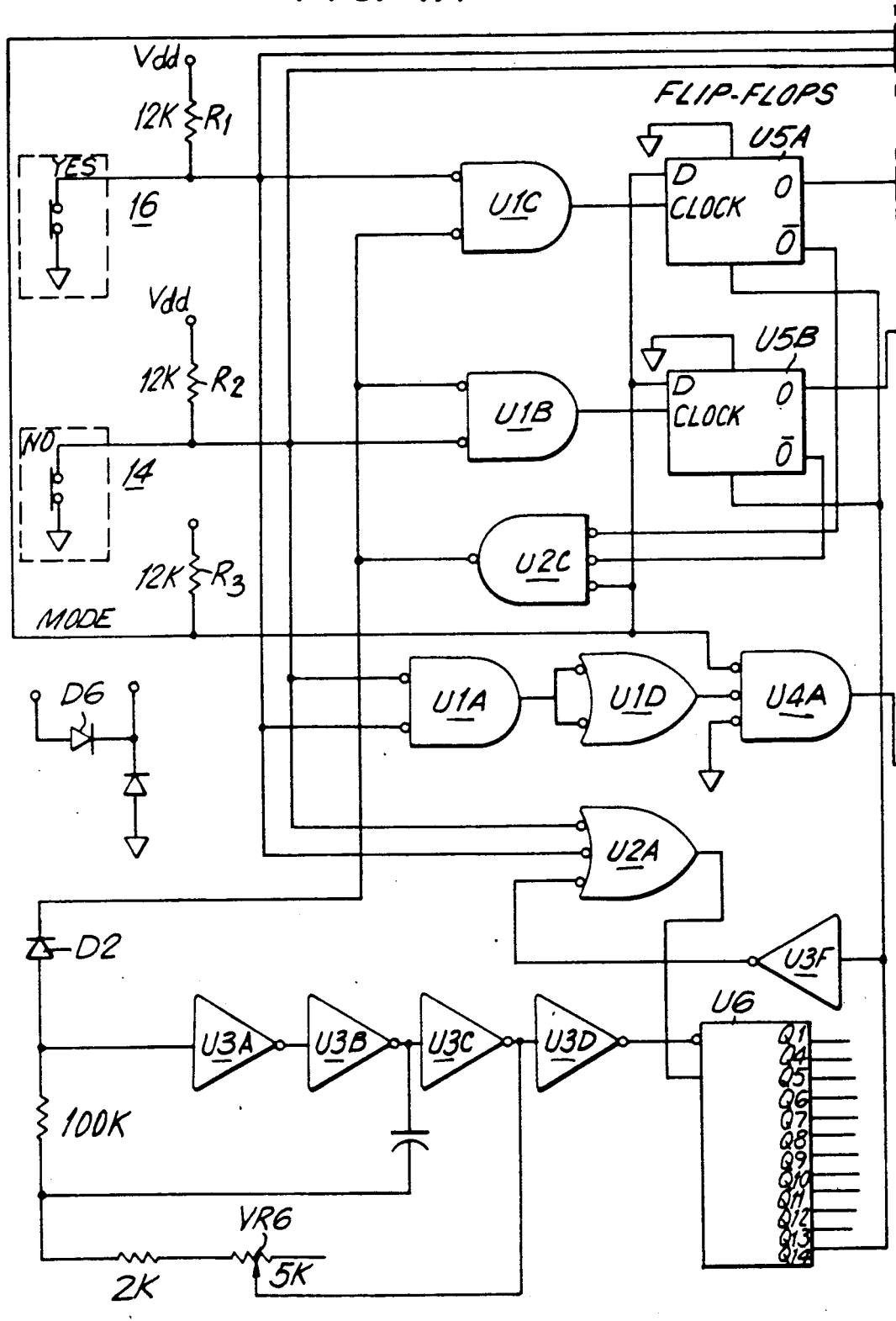
FIG. 4A and 4B comprise a schematic view of the circuitry for the opinion sampling device.
Figure 4B:
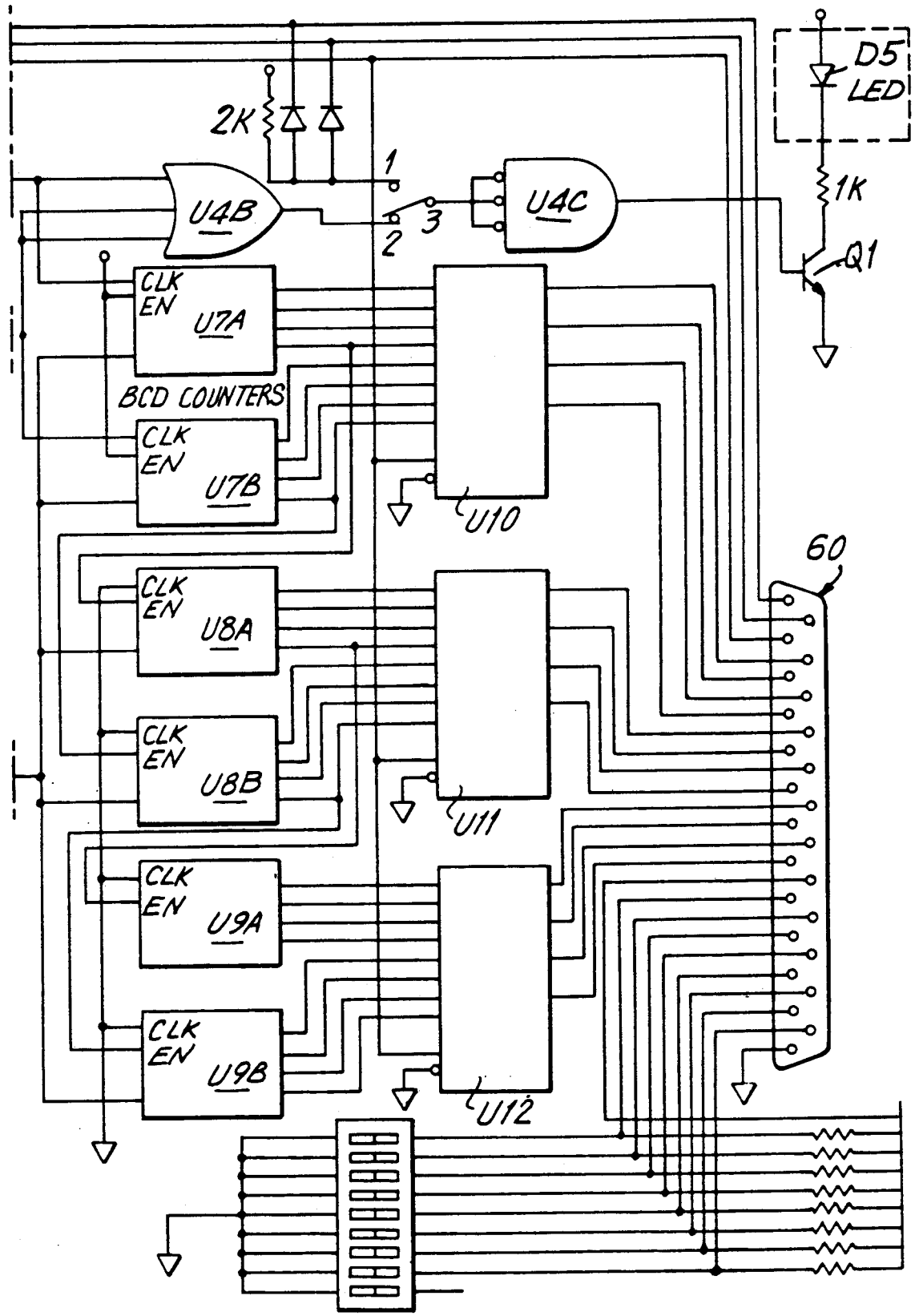

FIGS. 4A and 4B comprise a schematic view of the circuitry of device 10 and may be read side by side, FIG. 4A being to the left of FIG. 4B. Referring now in detail to FIGS. 4A and 4B, as long as the MODE signal is high, either, but not both, of the counters may be advanced by depressing pushbutton 14 or 16. As shown, the MODE signal is normally held high by Vdd applied through R1 and is input to flip-flops U5A and U5B, gate U2C, and to one pin on connector 60. When the MODE signal is high and neither pushbutton 14, 16 has been depressed, the flip-flops U5A and U5B are in a rest or idle state in which their outputs "O" are low and their complemented outputs "O" are high. In this state, the three inputs to gate U2C, comprising the complemented outputs from flip-flops U5A and U5B and the MODE signal, are high, which causes gate U2C to have a low output.

As shown, the output of U2C comprises one input to gates U1B and U1C. The other input to gate U1B is a circuit comprising pushbutton 14 and the other input to gate U1C is a circuit comprising pushbutton 16. When pushbuttons 14, 16 are open, these inputs to gates U1B and U1C are held high by Vdd applied through R2 and R3, respectively. However, if either pushbutton 14, 16 is depressed, the input to its corresponding gate U1B or U1C is pulled low by connection to ground. Consequently, a low output from U2C enables gates U1C and U1B in the sense that pressing pushbutton 14 or 16 causes the output of the corresponding gate U1B or U1C to go high. The outputs from gates U1B and U1C are applied, respectively, to the clock inputs of flip-flops U5A and U5B. Since the "D" inputs to these flip-flops are held high by the MODE signal, a high signal from gate U1B or U1C to the clock input of its corresponding flip-flop U5A or U5B causes the output "O" of that flip-flop to go high. The outputs of flip-flops U5A and U5B are applied, respectively, to the clock inputs of BCD counters U7A and U7B, and also to gate U4B. A high input to either counter U7A or U7B advances that counter by one.

U7A is part of a counter array comprising U7A, U8A and U9A, and U7B is part of a counter array comprising U7B, U8B and U9B. The output from the Most Significant Bid ("MSB") of counter U7A is applied to the input EN of counter U8A, and the output from the MSB of counter U8A is applied to the input EN of counter U9A. Likewise, the MSB output from U7B is applied to input EN of U8B whose MSB output is, in turn, applied to the input EN of U9B. Consequently, for each counter array, U7 is the least significant digit and U9 the most significant digit. The counters U7A, U7B are advanced on the positive edge of the signals from the outputs of the flip-flops U5A, U5B, respectively, while the counters U8A, U8B, U9A and U9B are advanced on the negative edge of the MSB output from the previous counter.

When the output "O" of flip-flop U5A or U5B goes high, its complemented output "Ō" goes low, which causes the output of gate U2C to go high, thereby disabling the outputs of gates U1B and U1C. That is, as long as the output of gate U2C remains high, pressing pushbuttons 14, 16 has no effect on the output of gates U1B and U1C and hence will not advance the counters. This condition prevails until the output gate U2C again goes low, which occurs when flip-flops U5A and U5B are reset whereupon their complemented outputs "Ō" go low. As shown, the reset signal for flip-flops U5A and U5B is the output from 14 stage ripple carry binary counter U6 functioning as a time delay means. Ripple counter U6 is triggered by a high output from gate U2A. The output from gate U2A goes high when any of its inputs are low, which occurs when pushbutton 14 or 16 is depressed, or when the counter U6 reaches the desired count, that is to say, the desired time delay. When the time delay is reached, output Q14 of counter U6 resets the flip-flops U5A and U5B whereupon gate U2C goes low thereby re-enabling pushbutton switches 14, 16. Simultaneously, a low signal is applied to gate U2A via gate U3F for resetting the counter U6.

The oscillator comprised of U3A, U3B, U3C and U3D establishes a clock frequency for counter U6, which, as noted, begins its count each time the output from U2A goes high. The time required for counter U6 to produce a high output at Q14 depends on the clock frequency of the oscillator, which is adjustable via variable resistor VR6. The time delay available from the circuit of FIGS. 4A and 4B, i.e., the time required for counter U6 to produce a high output at Q14, is 6-19 seconds, depending upon the adjustment of VR6. Note that as long as the output of gate U2C is low, that is, in the idle state, the input to the oscillator at U3A is also held low, whereby no oscillation occurs and counter U6 does not count. When the output of U2C goes high after one of the pushbuttons 14, 16 is pressed, the input at U3A also goes high whereupon the oscillator begins to run. In this regard, recall that depressing either pushbutton 14, 16 resets the counter U6, via gate U2A, to begin counting anew.

Lighting of indicator light 18, which may be an LED D5, is controlled by transistor Q1 operating as a switch. As long as the input to gate U4C is high, the output of Q1 is low, and light 18 remains off. However, when the input to gate U4C goes low, its output goes high for driving Q1, and LED 18 lights. A jumper J2 provides two modes of turning light 18 on. When the jumper J2 is installed between pins 1 and 3, the light 18 stays on as long as one of the pushbuttons 14, 16 is depressed. When the jumper J2 is placed between pins 2 and 3, the pilot light 18 stays on during the time delay, since the output of gate U4B remains low as long as one of the outputs "O" from the flip-flops U5B, U5C remain high, i.e., until the flip-flops are reset by counter U6 after the time delay has elapsed.

Focusing now on the multiplexers U10, U11 and U12, when the opinion sampling device 10 is in the READ mode, i.e., when device 10 is connected to display unit 46, each multiplexer U10, U11 and U12 transmits one BCD digit through connector 60 to the display unit. That is, multiplexer U10 transmits the count stored in U7A or U7B, multiplexer U11 transmits the count in U8A or U8B and multiplexer U11 transmits the count in U9A or U9B. More particularly, when pushbutton 14 is pressed, the select inputs to the multiplexers are grounded, and the multiplexers read the "NO" count from U7B, U8B and U9B. At all other times the select input to the multiplexers is "high" and the multiplexers read the "YES" count from U7A, U8A and U9A. It will therefore be apparent that the multiplexers are used solely to select which count, i.e., "NO" or "YES", is transmitted to the display unit 46.

Resetting of counters U7A, U7B, U8A, U8B, U9A and U9B is controlled by the output of gate U4A, i.e., whenever the output of gate U4A is high, the counters are reset. As shown, gate U4A has three inputs, namely, ground, the output from gate U1D, and the MODE line. The MODE line is normally high, which maintains the output of gate U4A low. When the MODE line is pulled low, which occurs when display unit 46 is connected to the device 10 and switch 58 on display unit 46 is closed, i.e. "ON", the output of gate U4A goes high when pushbuttons 14 and 16 are simultaneously depressed. Note that U1D is used as an inverter for the output of gate U1A for providing a low level to the input of gate U4A when pushbuttons 14, 16 are simultaneously depressed. Note also that a low level on the MODE line also disables the flip-flops U5A and U5B such that no counting takes place.

The circuit for the device 10 illustrated in FIG. 4 is preferably powered by a 6 volt battery pack 44. In a well known manner, diodes D6 and D2 protect the integrated circuits on circuit board 38 from being damaged by a reversed supply voltage.

OPERATION OF THE CIRCUIT FOR DISPLAY UNIT 46

FIG. 5 is a schematic representation of the circuit for the display unit 46 for displaying the "YES" and "NO" counts stored by the counter arrays in device 10. Since the counter arrays U7A, U8A, U9A and U7B, U8B and U9B count to a maximum of 999, display unit 46 has three 7-segment LED displays DIS1, DIS2 and DIS3 for displaying numbers from 0-999. As shown, each LED display DIS1, DIS2 and DIS3 is preceded by a current limiting resistor network and a BCD to 7-segment decoder/driver. As will by now be apparent, when connector 52 on display unit 46 is connected to connector 60 of device 10, BCD data from one of the counters arrays is input to the decoder/drivers U21, U22 and U23. As will be more fully explained below, the decoder/drivers are wired to blank the LED displays until one of the pushbuttons 14, 16 is depressed. When one of the pushbuttons is depressed, the 7-segment displays DIS1, DIS2 and DIS3 display the contents of the counter array associated with that pushbutton. The logic for turning the displays DIS1, DIS2 and DIS3 on is implemented with gates U24A, U24B, U24C and U24D. As shown, the output of gate U24C is input through the decoder/drivers U21, U22 and U23 such that U21, U22 and U23 drive the displays DIS1, DIS2 and DIS3 when the output from U24C is high and blank the displays when U24C's output is low. Gates U24A, U24B and U24D collectively comprise an AND gate, with the output of gate U24D high only when neither pushbutton 14, 16 is depressed. Under this condition, the output of gate U24C is low and the display is blank. When either pushbutton is depressed, the output of U24C goes high, the decoder/drivers U21, U22 and U23 are enabled, and the count stored in the counter array corresponding to the depressed pushbutton is displayed on the three digit LED display 54 comprising DIS1, DIS2 and DIS3.

Also shown in FIG. 5 is toggle switch 58. As described above, when toggle switch 58 is closed (display is on), the MODE signal is pulled low. As also described above, when the MODE signal is low, (1) the count stored in the device 10 may be read by display unit 46 by depressing one of the pushbuttons 14, 16, (2) the counter arrays in the device 10 may be reset to zero by simultaneously depressing both pushbuttons 14, 16, and (3) the flip-flops U5A and U5B are disabled such that depressing the pushbuttons 14, 16 does not advance the count.

The display unit 46 is preferably powered by a 9 volt battery stepped down by a diode network comprising D11, D12 and D13. Stepping down the supply voltage for the display unit 46 reduces the voltage difference between the device 10 and the display unit 46, thereby minimizing "noise" when the two units are connected together.

Although a detailed description of the preferred embodiments of the present invention is provided above, persons of ordinary skill in the art who have read this description will understand that various changes and modifications may be made therein without departing from the spirit and scope of the invention. For example, it is a relatively simple matter to modify the device 10 and display unit 46 to enable the counter unit to count numbers exceeding 999 and for the display unit to display them. Likewise, it is a relatively simple matter to modify the display unit 46 to store the count from a particular device 10 in lieu of or in addition to displaying the count. If this modification is employed, and assuming, as will almost invariably be the case, that a plurality of devices 10 are in use, means will be necessary to distinguish among the various devices. To this end, and referring again to FIG. 4, each device 10 may be provided with an ID CODE section comprising, for example, a 9-position dip switch SW4. In a manner known in the art, the dip switch SW4 in conjunction with resistor array RA1 can be used to provide a unique BCD or hexadecimal ID code for a particular device 10 by appropriate positioning of the nine switches on the dip switch SW4. As shown in FIG. 4, this unique ID code may be output via connector 60 on device 10 to display unit 46. Alternatively, and as a possible further modification, all of the devices 10 at a particular location or group of locations may be addressed by a remote computer, with each device 10 being identifiable by its unique ID code. If this is done, each device 10 could be tested, read and reset from the remote computer.

Still a further possible modification is to replace pushbuttons 14, 16 with a touch tone telephone in interactive communication with the device 10.

Since the foregoing as well as additional changes and modifications will suggest themselves to persons of ordinary skill in the art who have read this description, the above description should be construed as illustrative, and not in a limiting sense, the scope of the invention being defined by the following claims.

We claim:
1. An electronic polling device comprising:
   a first housing:
   a plurality of switch means mounted on said housing for manipulation by a user for entering a response to an inquiry, each switch means representing a specific response to said inquiry;
   circuit means in said housing, said circuit means comprising counting means in electrical communication with said switch means for separately counting and storing the number of times each switch means is manipulated;
   time delay means in said housing in electrical communication with said counting means for disabling said counting means for a predetermined time period after manipulation of one of said switch means, thereby discouraging repetitive responses by a single user;
   a numeric display means; and
   a display unit, said display unit including a second housing, said numeric display means being mounted on said second housing, and means for releasably connecting said display means in electrical communication with said counting means.

2. The apparatus of claim 1, further comprising means for successively transmitting from said counting means to said display means the number of times each of said switch means has been manipulated.

3. The apparatus of claim 2, wherein said transmitting means comprises means responsive to manipulation of each of said switching means for transmitting to said display means the number of times said switch means has been manipulated.

4. The apparatus of claim 1, further comprising means for resetting said counting means to zero.

5. The apparatus of claim 4, wherein said means for resetting said counter means to zero comprises means for resetting said counter means to zero in response to simultaneous manipulation of at least two of said switch means.

6. The apparatus of claim 3, wherein said display unit further comprises means for enabling said transmitting means.

7. The apparatus of claim 4, wherein said display unit further comprises means for enabling said reset means.

8. The apparatus of claim 4, wherein said means for resetting said counter means to zero comprises means for resetting said counter means to zero in response to simultaneous manipulation of at least two of said switch means.

9. The apparatus of claim 1, wherein said time delay means further comprises means for varying said time delay.

10. The apparatus of claim 1, wherein said time delay means further comprises a reset means in electrical communication with said time delay means for restarting said predetermined time period whenever one of said switch means is manipulated before said predetermined time period has elapsed.

11. The apparatus of claim 1, wherein said plurality of said switch means comprises two switch means.

12. The apparatus of claim 1, wherein said predetermined time period is about 6 to about 19 seconds.

13. The apparatus of claim 1, further comprising an indicator light mounted on said housing and connected to said circuit means, said circuit means including means for lighting said light when one of said switch means is manipulated.

14. The apparatus of claim 1, further comprising means for displaying said inquiry.

15. The apparatus of claim 14, wherein said means for displaying said inquiry comprises a placard supported by said housing.

16. An electronic polling device comprising:
a first housing;
a plurality of switch means mounted on said housing for manipulation by a user for entering a response to an inquiry, each switch means representing a specific response to said inquiry;
circuit means in said housing, said circuit means comprising counting means in electrical communication with said switch means for separately counting and storing the number of times each switch means is manipulated;
time delay means in said housing in electrical communication with said counting means for disabling said counting means for a predetermined time period after manipulation of one of said switch means, thereby discouraging repetitive responses by a single user;
numeric display means, and means for connecting said numeric display means in electrical communication with said counting means for displaying the numbers stored by said counting means; and
means for successively transmitting from said counting means to said display means the number of times each of said switch means has been manipulated.

17. The apparatus of claim 16, wherein said transmitting means comprises means responsive to manipulation of each of said switching means for transmitting to said display means the number of times said switch means has been manipulated.

18. The apparatus of claim 16, further comprising means for resetting said counting means to zero.

19. The apparatus of claim 16, wherein said display unit further comprises means for enabling said transmitting means.

20. The apparatus of claim 18, wherein said circuit means further comprises means for enabling said reset means.

21. The apparatus of claim 17, wherein said housing includes a cover movable to an open position for exposing said circuit means, wherein said circuit means comprises a first connector in electrical communication with the output of said counting means, and wherein said means for connecting said display means to said counting means comprises a cable having a second connector at one end for releasable connection to said first connector.

22. An electronic polling device comprising:
a first housing;
a plurality of switch means mounted on said housing for manipulation by a user for entering a response to an inquiry, each switch means representing a specific response to said inquiry;
circuit means in said housing, said circuit means comprising counting means in electrical communication with said switch means for separately counting and storing the number of times each switch means is manipulated;
time delay means in said housing in electrical communication with said counting means for disabling said counting means for a predetermined time period after manipulation of one of said switch means, thereby discouraging repetitive responses by a single user;
an indicator light mounted on said housing and connected to said circuit means, said circuit means including first means for momentarily lighting said light when one of said switch means is manipulated and second means for lighting said light from the time one of said switch means is manipulated until said predetermined time period elapses, and means for selecting one of said first and second means for lighting said light.

23. A method for polling responses to an inquiry, comprising the steps of:
providing a device having a plurality of switch means in electrical communication with a counting means for counting and storing the number of times each switch means is manipulated, said switch means being mounted on a first housing for manipulation by a user for entering a response to an inquiry, each switch means representing a specific response to said inquiry,
providing a display unit including a second housing where a numeric display means is mounted;
separately counting and storing the number of times each specific response to said inquiry is entered to said device;
discontinuing storing responses for a predetermined time period after a response is entered to said device, thereby discouraging repetitive responses by a single user;
intermittently connecting said numeric display means with the counting means; and
displaying with said display means the number stored in said counting means.

24. The method of claim 23, further comprising the step of restarting the predetermined time period, during which counting of responses is discontinued whenever a response is received during the predetermined time period.

25. The method of claim 24, further comprising the step of reading and displaying the number of times each specific response is entered to said device.

26. The method of claim 25, further comprising the step of clearing the stored responses.

* * * * *